United States Patent [19]
Chung et al.

[11] Patent Number: 5,686,962
[45] Date of Patent: Nov. 11, 1997

[54] MOTION IMAGE CODER USING PRE-FILTER TO REDUCE QUANTIZATION ERROR

[75] Inventors: Tae-yun Chung, Kwacheon; Jung-suk Kang, Seoul, both of Rep. of Korea

[73] Assignee: Samsung Electronics Co., Ltd., Kyungki-do, Rep. of Korea

[21] Appl. No.: 366,727

[22] Filed: Dec. 30, 1994

[30] Foreign Application Priority Data

Jul. 30, 1994 [KR] Rep. of Korea .................. 94-18934

[51] Int. Cl.⁶ ..................... H04N 7/48; H04N 7/50
[52] U.S. Cl. ..................... 348/402; 348/416; 348/699
[58] Field of Search ............... 348/27, 384, 390, 348/400–405, 407, 409–413, 415, 416, 420, 699; 382/232, 236, 238, 244–246, 248–251; H04N 7/130, 7/133, 7/137

[56] References Cited

U.S. PATENT DOCUMENTS

| | | | |
|---|---|---|---|
| 4,731,664 | 3/1988 | Nishiwaki et al. | 348/420 |
| 5,046,071 | 9/1991 | Tanoi | 348/415 |
| 5,111,293 | 5/1992 | Yamashita | 348/409 |
| 5,136,376 | 8/1992 | Yagasaki et al. | 348/409 |
| 5,299,019 | 3/1994 | Pack et al. | 348/405 |
| 5,406,501 | 4/1995 | Florent | 348/699 |
| 5,418,569 | 5/1995 | Ando | 348/405 |

*Primary Examiner*—Richard Lee
*Attorney, Agent, or Firm*—Leydig, Voit & Mayer, Ltd.

[57] ABSTRACT

A motion image coder is provided with a pre-filter for performing a pre-filtering which adaptively restricts the band for characteristics of the coded blocks. The pre-filtered result is used in determining quantization step size, thereby halving the quantization error causing a picture quality deterioration into a resolution error. Therefore, picture quality can be improved.

2 Claims, 4 Drawing Sheets

MOTION IMAGE CODER USING PRE-FILTER TO REDUCE QUANTIZATION ERROR

BACKGROUND OF THE INVENTION

The present invention relates to a motion image coding apparatus, and more particularly, to a motion image coding apparatus for implementing the efficient compression of a high-picture-quality image signal by effectively dispersing picture quality deterioration due to a quantization error, using a pre-filter and a proposed quantization method.

Currently, digital image information processing technologies are being adopted in such fields as high-definition televisions, digital videocassette recorders and video conferencing systems, with applications expected to expand rapidly. As more and more analog systems are converted for the benefits which accompany digital technology (e.g., improved picture quality, better reliability and easy processing), vast amounts of data become necessary. Due to the increased amount of data to be processed, various compression techniques for the efficient use of transmission channels and storage media are being actively studied.

Referring to FIG. 1, a general compression method for image signals is effectively performed by removing surplus information therefrom, using the correlation between space and time and by variable-length coding the obtained image signal. A typical compression method is an entropy coding method using a motion-compensated discrete cosine transform (DCT) function. Here, the advantage is that the information contained in the original image signal can be expressed using only a small amount of information and with a high degree of fidelity by coding a low-frequency portion, since the energy of the image signal transform-operated thereto is concentrated in the low-frequency portion. Also, according to the variable-length coding, a given code word is assigned variably depending on a probability concentration of the image information, to then transmit the variable-length code word suitable for the case when image information to be processed is heterogeneously distributed. Accordingly, variable-length coding using DCT transform coding is a compression method for fully expressing the motion image signal in which non-uniform image information is distributed.

However, since the DCT-operated image information generally has a smaller dispersion value than the original signal but has a larger motion range, it is necessary to perform a quantization process for expressing transform coefficients with a restricted number of codes. That is, the quantization process is a process for approximating the DCT-operated image data into the codes of a given variable-length code book. Therefore, by the quantization process, a picture quality deterioration is generated due to information distortion.

Also, when storing or transmitting image information compressed by variable-length coding, the generated information amount per time unit should be constant. Therefore, the information amount is adjusted by installing a buffer and by performing a forward or backward bit-rate control, which is also realized by the adjustment of the quantization step size.

The forward bit-rate controlling method has an advantage in that the error by the storage or transmission media is propagated only within a given fixed-length unit. However, this method lowers the coding efficiency since it is difficult to make the generated information amount coincide with the target information amount of the fixed-length unit.

On the other hand, the backward bit-rate controlling method has an advantage in that it can make the generated information amount coincide with the target information amount of the fixed-length unit, since the quantization step size is determined by the buffer fullness with the buffer state checked in a predetermined period. However, it also has a disadvantage in that a deterioration of picture quality is liable to be generated since the quantization step size is determined irrespective of the human visual system.

To solve such problems, there have been recent studies on a method for determining the final quantization step size by a combination of the backward bit-rate controlling method and a forward activity estimation, as shown in FIG. 2, which considers the complexity of the image information composing a block unit which updates the quantization step size. Although such a method can improve picture quality to some extent, there is still a deterioration of picture quality which can be sensed by the human visual system, i.e., a blocking effect, due to the distortion of the image information by quantization errors in the case of a large quantization step size.

SUMMARY OF THE INVENTION

To solve the above problems, therefore, it is an object of the present invention to provide a motion image coding apparatus having a pre-filter provided upstream for performing a pre-filtering in order to restrict the band adaptively for characteristics of the coded blocks and in which the pre-filtering result is used in determining the quantization step size.

To accomplish the above object, there is provided a motion image coding apparatus according to the present invention comprising: a first field/frame memory for storing an input source image in units of fields or frames in accordance with coding mode; a pre-filter for adaptively restricting the band for the characteristics of coded blocks with respect to the source image output from the first field/frame memory; a subtractor for subtracting a motion-compensated previous image signal from the current image signal output from the pre-filter and outputting a difference image signal; a discrete cosine transform (DCT) circuit for performing a DCT function with respect to the difference image signal output from the subtractor; a quantizer for quantizing the output signal of the DCT circuit into a predetermined quantization step size; a variable-length coder for variable-length-coding the output signal of the quantizer; a multiplexer for multiplexing the output signal of the variable-length coder, quantization parameters and motion vectors and outputting the multiplexed data; a buffer for storing temporarily the data output from the multiplexer and transmitting the stored data to a receiver side at a constant rate; a bit-rate controller for determining a base quantization step size by the data fullness of the buffer; an activity calculator for calculating the image activity from the base quantization step size output from the bit-rate controller and the passband index of the pre-filter, thereby determining a final quantization step size based on the activity in order to control the quantizer; an inverse quantizer for restoring the signal quantized in the quantizer into the original signal before the quantization; an inverse DCT circuit for restoring the signal inverse-quantized in the DCT transformation into the original signal before the DCT transformation; an adder for adding the restored image signal output from the inverse DCT circuit with the motion-compensated previous image signal; a second field/frame memory for storing the motion-compensated restored image signal output from the adder in units of fields or frames in accordance with coding mode; a motion estimator for generating motion vectors for constituting a current image depending on the previous image output from the pre-filter; and an adaptive predictor for compensating motion position of the previous image stored in the second field/frame memory with the motion vectors output from the motion estimator.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
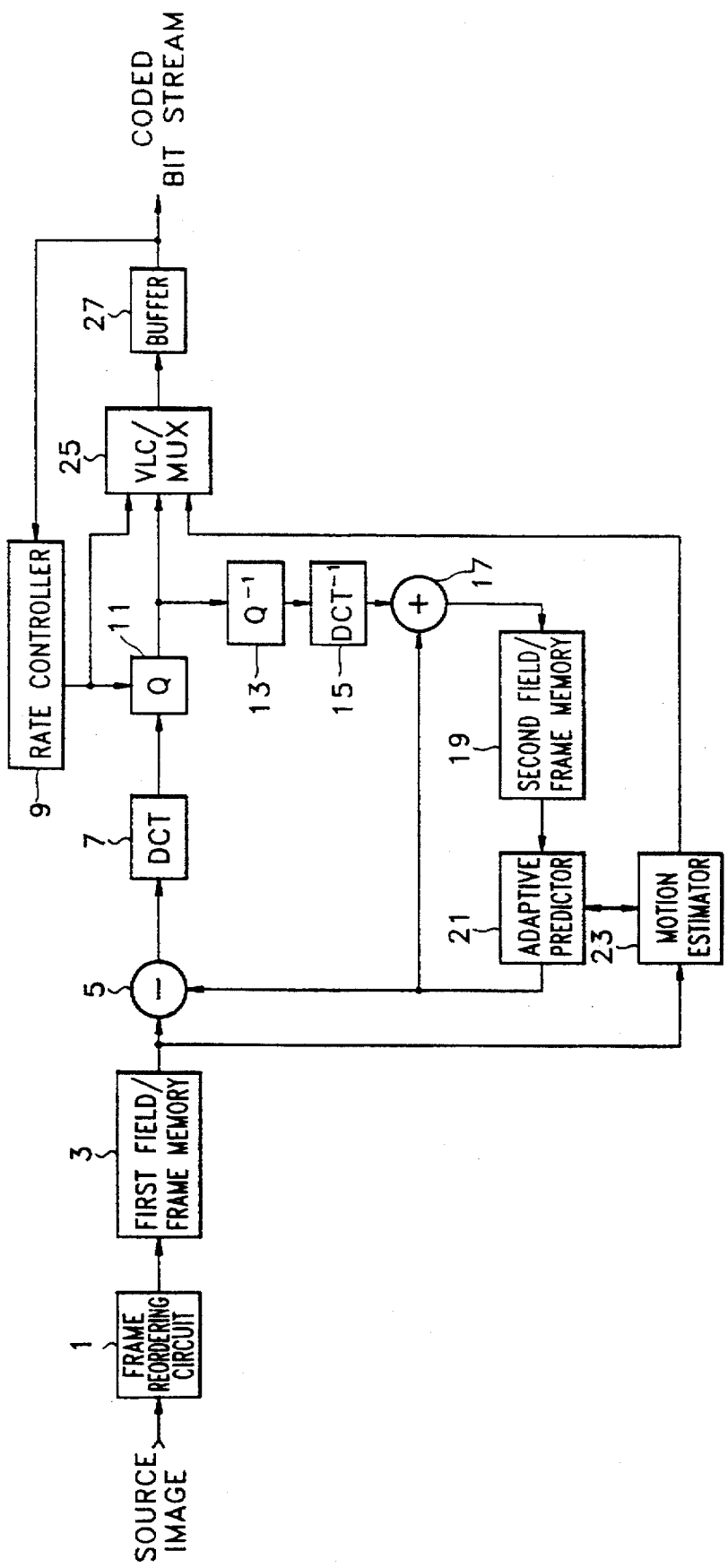
FIG. 1 is a block diagram of a conventional motion image coder.
Figure 2:
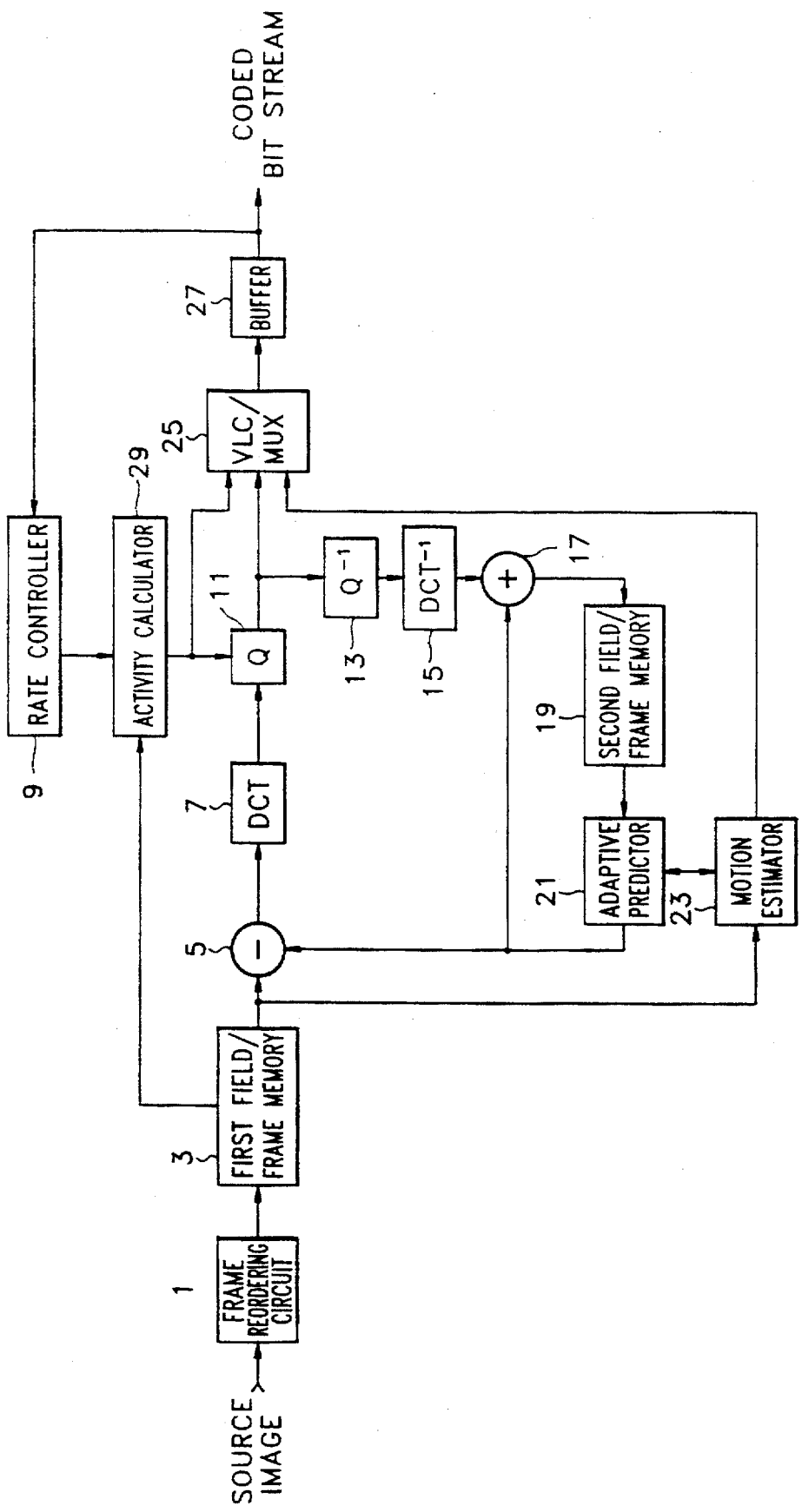
FIG. 2 is a block diagram of another conventional motion image coder.
Figure 3:
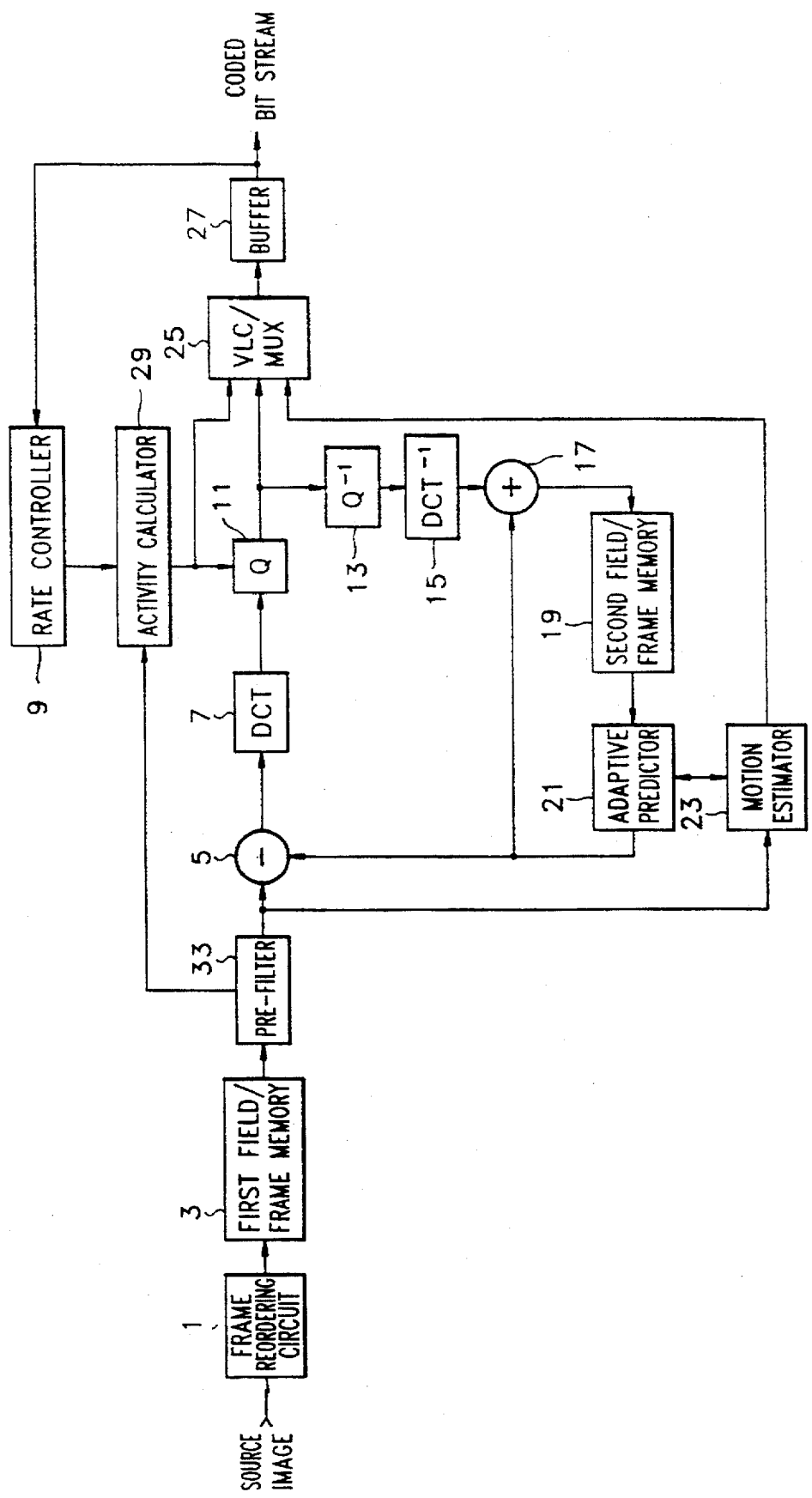
FIG. 3 is a block diagram of the motion image coder according to the present invention.

Compared to the conventional motion image coder shown in FIG. 1, the motion image coder shown in FIG. 3 further includes a pre-filter 33 and an activity calculator 29. Also, if compared to the conventional motion image coder shown in FIG. 2, it further includes a pre-filter 33.

Referring to FIG. 3, a frame reordering circuit 1 inputs a source image signal and performs a color coordinate transform, sub-sampling or block partition to reorder frames.

First field/frame memory 3 stores the image signal output from frame reordering circuit 1 in field units in the case of inter-frame coding, and stores the image signal output from frame reordering circuit 1 in frame units in the case of intra-frame coding.

Pre-filter 33 performs a pre-filtering with respect to the image signal of the units of fields or frames output from first field/frame memory 3 to restrict the band adaptively for the characteristics of coded blocks.

Subtractor 5 subtracts a motion-compensated previous image signal output from an adaptive predictor 23 from the current image signal output from the pre-filter 33 and outputs a difference image signal.

DCT circuit 7 performs a DCT function with respect to the difference image signal output from the subtractor 5 to output a transform coefficient for the difference image signal.

Quantizer (Q) 11 quantizes the output signal of the DCT circuit 7 into a predetermined quantization step size.

Variable-length coder & multiplexer (VLC/MUX) 25 variable-length-encodes the output signal of the quantizer, multiplexes the output signal of the variable-length coder, quantization parameters and motion vectors, and outputs the multiplexed data.

Buffer 27 temporarily stores the data output from the multiplexer since the lengths of data output from variable-length coder & multiplexer 25 are not constant, and transmits the stored data to a receiver side at a constant rate.

Bit-rate controller 9 determines a base quantization step size by the data fullness of buffer 27. That is, if the data fullness of buffer 27 is high, the amount of the data output from the quantizer 11 is decreased by increasing the quantization step size. If the data fullness of buffer 27 is low, the amount of the data output from the quantizer 11 is increased by decreasing the quantization step size.

Activity calculator 29 determines a final quantization step size, based on the base quantization step size output from bit-rate controller 9 and the image activity, thereby controlling quantizer 11.

inverse quantizer ($Q^{-1}$) 13 restores the signal quantized in the quantizer, into the original signal before quantization. Similarly, inverse DCT ($DCT^{-1}$) 15 restores the signal inverse-quantized in the inverse-quantizer, into the original signal before DCT transformation.

Adder 17 adds the restored image signal output from inverse DCT 15 with the motion-compensated previous image signal output from adaptive predictor 21.

Second field/frame memory 19 stores the restored image signal output from adder 17 in the unit of fields or frames in accordance with coding modes.

Motion estimator 23 generates motion vectors for constituting a current image depending on the previous image output from pre-filter 33.

Most coders perform a full search for generating motion vectors on the basis of a minimum absolute error in the unit of fixed blocks within a constant range. The motion vectors generated in motion estimator 23 are output to adaptive predictor 21 and variable-length coder & multiplexer 25.

Adaptive predictor 21 compensates the motion position of the previous image stored in the second field/frame memory 19 with the motion vector data output from the motion estimator 23 to then output to subtractor 5 and to adder 17.

Next, among the components of the motion image coder shown in FIG. 3, the filtering operation of pre-filter 33 and the quantization step size determining operation of bit-rate controller 9 and activity calculator 29 will now be described in more detail.

The motion image coder according to the present invention line-subsamples an input signal of the component having a 4:2:2 format with respect to a chrominance signal and performs a transform in a 4:2:0 format to then utilize the signal as a source image signal of the motion image coder. Also, the compression and coding of the image signal are performed in the quantization parameter renewal unit of a macroblock (luminance signal Y: 16×16; chrominance signals Cr and Cb: 8×8).

For the similar purpose to that of the present invention, the MPEG standard authorizes a weighting matrix which is a human visual sensitivity characteristic for DCT coefficients. However, in such a method, for each 8×8 block, 8 bit additional information, i.e., 8 pels×8 lines×8 weighting information, is added to the bit stream information to be transmitted, thereby lowering the coding efficiency.

In the present invention, in order to reduce the picture quality deterioration due to the quantization error without any additional information, filter coefficients varied adaptively for the characteristics of 16×16 macroblock to be coded are selected to then restrict the band of the image signal so as to be suitable to the visual characteristics. In order to minimize a separate hardware for calculating the filter coefficients, it is devised so as to utilize the forward activity calculator 29.

First, pre-filter 33 has 3×3 pre-filter coefficients represented thus:

$$\frac{1}{(K+2)^2} \begin{bmatrix} 1 & K & 1 \\ K & K^2 & K \\ 1 & K & 1 \end{bmatrix}$$

Pre-filter 33 classifies the macroblock characteristics of the source image signal into n classes in accordance with the complexity of the image signal and then the filter passband index K is calculated depending on class information in the following way to then perform a low-pass filtering for each macroblock.

If $act<th_1$, then $K=K_1$
else if $th_1 \leq act < th_2$, then $K=K_2$ ...
else if $th_{n-2} \leq act < th_{n-1}$, then $K=K_{n-1}$
else $K=K_n$ Here, act represents a macroblock activity value, $th_n$ represents a threshold value for classifying into n classes, and n represents number of classes.

Activity calculator 29 performs a multiplication operation with respect to a base quantization parameter P1 depending on the data fullness of buffer 27, activity parameter P2 obtained by a forward activity calculation for an evaluation of the complexity of macroblocks for performing a coding and band-restricted compensation parameter P3 obtained using a passband index K of pre-filter 33.

First, the base quantization parameter P1 is calculated by the following equation (1).

$$P1 = \frac{Sd_j}{r} \quad (1)$$

In equation (1), $d_j$ represents data fullness of buffer 27, S is the number of quantization parameters (step number), and r is the size of buffer 27.

Meanwhile, the macroblock activity parameter P2 is calculated by the following equation (2).

$$P2 = \frac{2act + act_{avg}}{act + 2act_{avg}} \quad (2)$$

In the equation (2), act represents macroblock activity, and $act_{avg}$ represents the average activity of the preceding image.

Meanwhile, the band-restricted compensation parameter P3 is calculated by the following equation (3).

$$P3 = \sqrt{1 - \left(\frac{K - K_{max} + \alpha}{K_{max}}\right)^2} \quad (3)$$

In the equation (3), K represents a filter passband index, $K_{max}$ represents a maximum value of the filter passband index, and $\alpha$ represents a level adjustment factor.

The band-restricted compensation parameters are calculated as above in order to reduce such phenomena as blocking, which is unpleasant to the eye and caused by a quantization error. This reduction is accomplished by decreasing the quantization parameters to compensate for the lowered resolution of the spatial domain of the filtered image signal.

Therefore, the final quantization parameter Qf is obtained by the following equation (4) using the parameters represented by the above equations (1) to (3).

$$Q_i = P1 \times P2 \times P3 \quad (5)$$

Figure 4:
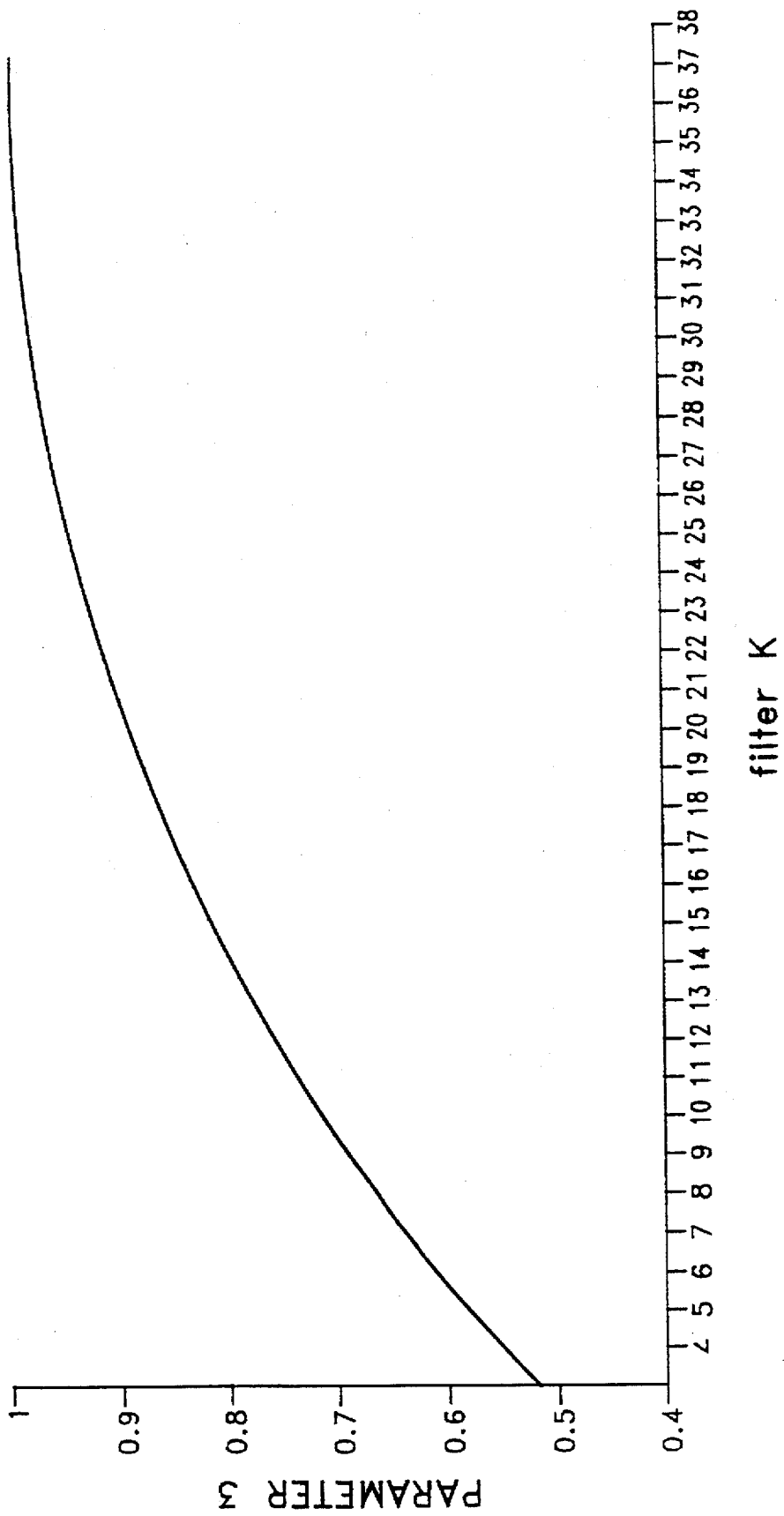
FIG. 4 is a graph showing characteristics of the band-restricted compensation parameters derived from the present invention.

FIG. 4 shows the characteristics of the band-restricted compensation parameter P3 depending on the filter passband index K.

As described above, the motion image coder according to the present invention improves picture quality by halving the quantization error causing a picture quality deterioration which is present in the conventional method into a resolution error, such that a pre-filter for performing a pre-filtering is provided upstream of the coder in order to restrict the band adaptively for characteristics of the coded blocks and the pre-filtered result is used in determining the quantization step size.

What is claimed is:

1. A motion image coding apparatus comprising:

a first field/frame memory for storing an input source image in units of fields or frames in accordance with a coding mode;

a pre-filter for adaptively restricting a band for characteristics of coded blocks with respect to the source image stored in said first field/frame memory, said pre-filter including a passband index, wherein said pre-filter classifies characteristics of the input source image into n classes according to the complexity of the image signal and calculates the passband index according to the classification, to thereby perform low-pass-filtering per macroblock of the input source image and outputting a current image signal;

a subtractor for subtracting a motion-compensated previous image signal from the current image signal output from said pre-filter and outputting a difference image signal;

a discrete cosine transform (DCT) circuit for performing a DCT function with respect to the difference image signal output from said subtractor;

a quantizer for quantizing the output signal of said DCT circuit into a predetermined quantization step size;

a variable-length coder for variable-length-coding the output signal of said quantizer;

a multiplexer for multiplexing an output signal of said variable-length coder, quantization parameters, and motion vectors, and outputting multiplexed data;

a buffer for temporarily storing data output from said multiplexer and transmitting the stored data to a receiver side at a constant rate;

a bit-rate controller for determining a base quantization step size by the data fullness of said buffer;

an activity calculator for calculating the image activity from the base quantization step size output from said bit-rate controller and the passband index of said pre-filter, thereby determining a final quantization step size based on the image activity for controlling said quantizer;

an inverse quantizer for restoring the signal quantized in said quantizer into the original signal before the quantization;

an inverse DCT circuit for restoring the signal inverse-quantized in said inverse quantizer into the original signal before DCT transformation by said DCT circuit and outputting an image signal;

an adder for adding the restored image signal output from said inverse DCT circuit to the motion-compensated previous image signal to produce a motion-compensated restored image signal;

a second field/frame memory for storing the motion-compensated restored image signal output from said adder in units of fields or frames in accordance with a coding mode;

a motion estimator for generating motion vectors for constituting a current image depending on a previous image output from said pre-filter; and an adaptive predictor for compensating motion position of the motion-compensated restored image signal stored in said second field/frame memory with the motion vectors output from said motion estimator.

2. A motion image coding apparatus comprising:

a first field/frame memory for storing a source image in units of fields or frames in accordance with a coding mode;

a pre-filter for adaptively restricting a band for characteristics of coded blocks with respect to the source image stored in said first field/frame memory, said pre-filter including a passband index and outputting a current image signal;

a subtractor for subtracting a motion-compensated previous image signal from the current image signal output from said pre-filter and outputting a difference image signal;

a discrete cosine transform (DCT) circuit for performing a DCT function with respect to the difference image signal output from said subtractor;

a quantizer for quantizing the output signal of said DCT circuit into a predetermined quantization step size;

a variable-length coder for variable-length-coding the output signal of said quantizer;

a multiplexer for multiplexing an output signal of said variable-length coder, quantization parameters, and motion vectors, and outputting multiplexed data;

a buffer for temporarily storing data output from said multiplexer and transmitting the stored data to a receiver side at a constant rate;

a bit-rate controller for determining a base quantization step size by the data fullness of said buffer;

an activity calculator for calculating the image activity from the base quantization step size output from said bit-rate controller and the passband index of said pre-filter, thereby determining a final quantization step size based on the activity for controlling said quantizer, wherein said activity calculator calculates the activity by multiplying a base quantization parameter, an activity parameter obtained by a forward activity calculation for an evaluation of macroblock complexity for performing a coding, and a band-restricted compensation parameter obtained using the passband index;

an inverse quantizer for restoring the signal quantized in said quantizer into the original signal before the quantization;

an inverse DCT circuit for restoring the signal inverse-quantized in said inverse quantizer into the original signal before DCT transformation by said DCT circuit and outputting a restored image signal;

an adder for adding the restored image signal output from said inverse DCT circuit to the motion-compensated previous image signal to produce a motion-compensated restored image signal;

a second field/frame memory for storing the motion-compensated restored image signal output from said adder in units of fields or frames in accordance with a coding mode;

a motion estimator for generating motion vectors for constituting a current image depending on a previous image output from said pre-filter; and an adaptive predictor for compensating motion position of the motion-compensated restored image signal stored in said second field/frame memory with the motion vectors output from said motion estimator.

* * * * *